Patented Sept. 20, 1932

1,877,866

UNITED STATES PATENT OFFICE

RICHARD HERZ, OF FRANKFORT-ON-THE-MAIN, AND WERNER ZERWECK, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

PROCESS OF HALOGENATING ANTHANTHRONE

No Drawing. Original application filed November 1, 1926, Serial No. 145,697, and in Germany November 7, 1925. Divided and this application filed December 11, 1929. Serial No. 413,320½.

This application is a division of our copending application Serial No. 145,697, filed November 1, 1926, which has matured into Pat. No. 1,803,757.

We have found that valuable vat dyestuffs of the anthanthrone series are obtainable by causing a halogenating agent to act upon anthanthrone in the absence of a diluent.

We prefer to use in our process an excess of the halogenating agent. The reaction can be carried out at ordinary or at elevated temperatures preferably below 100° C. As suitable halogenating agents there may be used: bromine, chlorine gas, and for chlorinating also those compounds which evolve chlorine during the reaction as, for instance, sulfuryl-chloride, antimony pentachloride, sulfur chlorides, alkali hypochlorites in the presence of an inorganic acid, and alkali chlorates in the presence of hydrochloric acid.

According to our new process, one or more chlorine atoms may be introduced into the anthanthrone molecule by passing, for instance, while stirring, chlorine in excess into finely ground anthanthrone to which a small amount of iodine, ferric chloride, antimony pentachloride, iodine-trichloride or a similar compound may be added as a halogen carrier.

In a similar manner bromine may be introduced into the anthanthrone molecule by mixing finely powdered anthanthrone with bromine, the latter preferably being used in excess, and stirring the mixture for some hours at ordinary or at elevated temperatures below 100° C.

The most valuable products are obtained when the halogenation is carred out in such a way that approximately two atoms of halogen enter into the molecule of the anthanthrone.

The new dyestuffs, corresponding probably to the general formula:

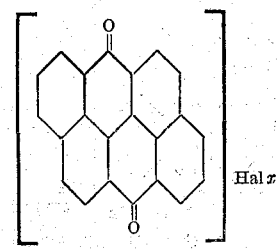

wherein $x$ is approximately the number 2 and Hal stands for chlorine, bromine, or chlorine+bromine, are when dry yellow to orange to red powders, difficultly soluble in organic solvents of a higher boiling point, easily soluble in concentrated sulfuric acid with a brilliant green color, forming with alkaline hydrosulfite violet colored vats, from which vegetable fibers are dyed yellowish-orange to orange to reddish shades of exceptional brightness and excellent fastness, particularly to light.

They surpass herein all orange vat dyestuffs hitherto known.

In order to further illustrate our invention, the following examples are given, the parts being by weight and all temperatures in centigrade degrees, but it is understood that our invention is not limited to the particular products or reaction conditions mentioned therein:

Example 1

A stream of chlorine is allowed to pass into finely ground anthanthrone (cf. German Patent No. 280,787, Example 1) to which as carrier a small amount of iodine or ferric chloride is added while stirring. The reaction takes place at ordinary temperature and may be accelerated by gently warming; it is finished when the increase of weight corresponds to the introduction of about two atoms of chlorine into the molecule. The carrier used is removed in the usual manner, for instance, by warming the product a little in vacuo or by treating it with a suitable solvent. The chlorinated dyestuff, thus obtained, is an orange powder soluble in concentrated sulfuric acid with a green color. It forms with alkaline hydrosulfite a violet vat, from which vegetable fibers are dyed a brilliant yellowish orange of excellent fastness.

*Example 2*

1 part of finely powdered anthanthrone is mixed with about 10 parts of bromine, and the mixture is stirred for some hours at ordinary temperature. Then the excess of bromine is removed, for instance, by distilling in vacuo. Traces of bromine, still adhering to the product, may be freed in the usual manner, for instance, by warming it with sodium bisulfite or a dilute soda solution. The new dyestuff, thus obtained, having probably the formula:

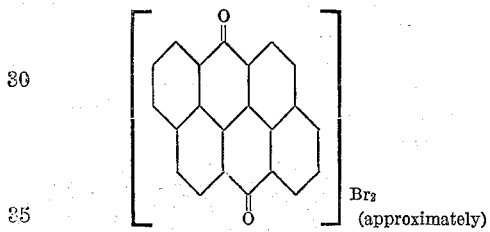

is a brilliant red powder, soluble in concentrated sulfuric acid with a brilliant green color. It forms a violet vat, from which vegetable fibers are dyed brilliant reddish orange shades of an excellent fastness.

By increasing the temperature during the process to about 60° (the approximate boiling point of bromine) the reaction is accelerated; and the addition of a carrier, such as iodine, promotes the bromination.

The bromination may also advantageously be carried out by allowing a current of bromine vapors to act on finely ground anthanthrone to which as carrier a small amount of iodine is added.

We claim:

The process which comprises reacting in an open vessel upon anthanthrone with bromine in excess of a small amount of iodine, at a temperature of about 60° C., until approximately two bromine atoms have been introduced into the anthanthrone molecule.

In testimony whereof we affix our signatures.

RICHARD HERZ.
WERNER ZERWECK.